United States Patent
Michelson et al.

(10) Patent No.: US 8,199,762 B2
(45) Date of Patent: *Jun. 12, 2012

(54) METHOD OF SIZING PACKETS FOR ROUTING OVER A COMMUNICATION NETWORK FOR VOIP CALLS ON A PER CALL BASIS

(75) Inventors: Steven M Michelson, Freehold, NJ (US); Jerry Allen Robinson, Middletown, NJ (US); Larry Arnise Russell, Atlantic Highlands, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1279 days.

This patent is subject to a terminal disclaimer.

(21) Appl. No.: 11/870,655

(22) Filed: Oct. 11, 2007

(65) Prior Publication Data

US 2008/0031229 A1 Feb. 7, 2008

Related U.S. Application Data

(63) Continuation of application No. 10/208,437, filed on Jul. 30, 2002, now Pat. No. 7,283,541.

(51) Int. Cl.
*H04L 12/28* (2006.01)

(52) U.S. Cl. ......... 370/401; 370/252; 370/352; 370/356

(58) Field of Classification Search .................. None
See application file for complete search history.

(56) References Cited

U.S. PATENT DOCUMENTS

| | | | |
|---|---|---|---|
| 6,614,781 B1 * | 9/2003 | Elliott et al. | 370/352 |
| 6,760,324 B1 | 7/2004 | Scott et al. | |
| 7,260,060 B1 * | 8/2007 | Abaye et al. | 370/230 |
| 7,283,541 B2 * | 10/2007 | Michelson et al. | 370/401 |
| 2001/0023454 A1 | 9/2001 | Fitzgerald | |
| 2002/0016937 A1 | 2/2002 | Houh | |
| 2002/0051464 A1 | 5/2002 | Sin et al. | |
| 2003/0002476 A1 * | 1/2003 | Chung et al. | 370/352 |
| 2003/0152028 A1 | 8/2003 | Raisanen et al. | |
| 2004/0002864 A1 | 1/2004 | Yeom | |
| 2004/0022237 A1 | 2/2004 | Elliott et al. | |
| 2004/0114570 A1 | 6/2004 | Vikberg et al. | |
| 2005/0122985 A1 | 6/2005 | Murphy | |

* cited by examiner

*Primary Examiner* — Duc C Ho

(57) ABSTRACT

A method for reducing latency of VoIP communications while efficiently using network resources and maintaining voice quality. This is achieved by managing packet size on a per-call basis, using factors such as distance between gateways, current backbone network status, service requested or access mechanism for a given call is disclosed. Packet size is selected on a per-call basis based on the distance between endpoints in the call. If the endpoints are far apart, the selected packet size is small. If the endpoints are close together, the selected packet size is large.

21 Claims, 5 Drawing Sheets

METHOD OF SIZING PACKETS FOR ROUTING OVER A COMMUNICATION NETWORK FOR VOIP CALLS ON A PER CALL BASIS

This application is a continuation of U.S. patent application Ser. No. 10/208,437, filed Jul. 30, 2002, entitled "Method of Sizing Packets For Routing Over A Communication Network For VoIP Calls On A Per Call Basis" (which will issue as U.S. Pat. No. 7,283,541 on Oct. 16, 2007). The aforementioned related patent application is herein incorporated by reference.

FIELD OF THE INVENTION

The present invention is directed to sizing packets to be transmitted over a communication network, and more particularly, to a method of sizing packets over an Internet Protocol (IP) network on a per call basis for Voice over IP (VoIP) calls.

BACKGROUND OF THE INVENTION

There are a number of attributes that affect perceived voice quality in Voice over IP (VoIP) networks. These attributes include latency and packet loss within the IP backbone network, and choice of voice coder/decoder (codec) at the gateway to the IP network. To ensure toll-quality voice communication, latency and packet loss in the backbone network must be kept below certain thresholds by managing various components of the network architecture.

The architectural components that need to be managed in the backbone network include the number and locations of routers in the backbone network, the transmission capacity deployed between routers, the quality of service mechanisms and routing algorithms employed in the network, the judicious selection of packet size and the appropriate sizing of jitter buffers. At the same time that these components are managed, it is also important to maximize the utilization of network resources to keep costs under control. Cost-effectively maintaining toll-quality voice communication in a VoIP network is a difficult and multi-faceted problem.

Routers in the communication network are limited in packet per second call processing capacity. With the relatively large size of packets used for data services, this does not become an issue. However, since voice communications use significantly smaller packets than data communications to reduce latency, the number of packets per second that must be routed through the network for a voice call is significantly larger than the number of packets to be routed for a data service with the same bandwidth allocation. As latency is reduced, this problem becomes worse, but can be mitigated by allowing latency to increase in certain circumstances.

SUMMARY OF THE INVENTION

The present invention is directed to a method for reducing latency of VoIP communications while efficiently using network resources and maintaining voice quality. This is achieved by managing packet size on a per-call basis, using factors such as distance between gateways, current backbone network status, service requested or access mechanism for a given call. The present invention also addresses efficient bandwidth utilization and the potential for bottleneck in the communication network due to the large-scale introduction of VoIP calls. Packet size is selected on a per-call basis based, for example, on the distance between endpoints in the call. If the endpoints are "far apart", the selected packet size is small. If the endpoints are "close together", the selected packet size is large.

In accordance with the present invention, a method is used to select the largest size packet in which to carry a call in order to improve bandwidth utilization and reduce packet per second load while ensuring that the total end-to-end one-way delay is maintained below a specific threshold such as 150 milliseconds (ms) in order to preserve voice quality.

BRIEF DESCRIPTION OF THE DRAWINGS

The present invention is illustrated by way of example and not limitation in the accompanying figures in which reference numerals indicate similar elements and in which.

DETAILED DESCRIPTION

Figure 1:
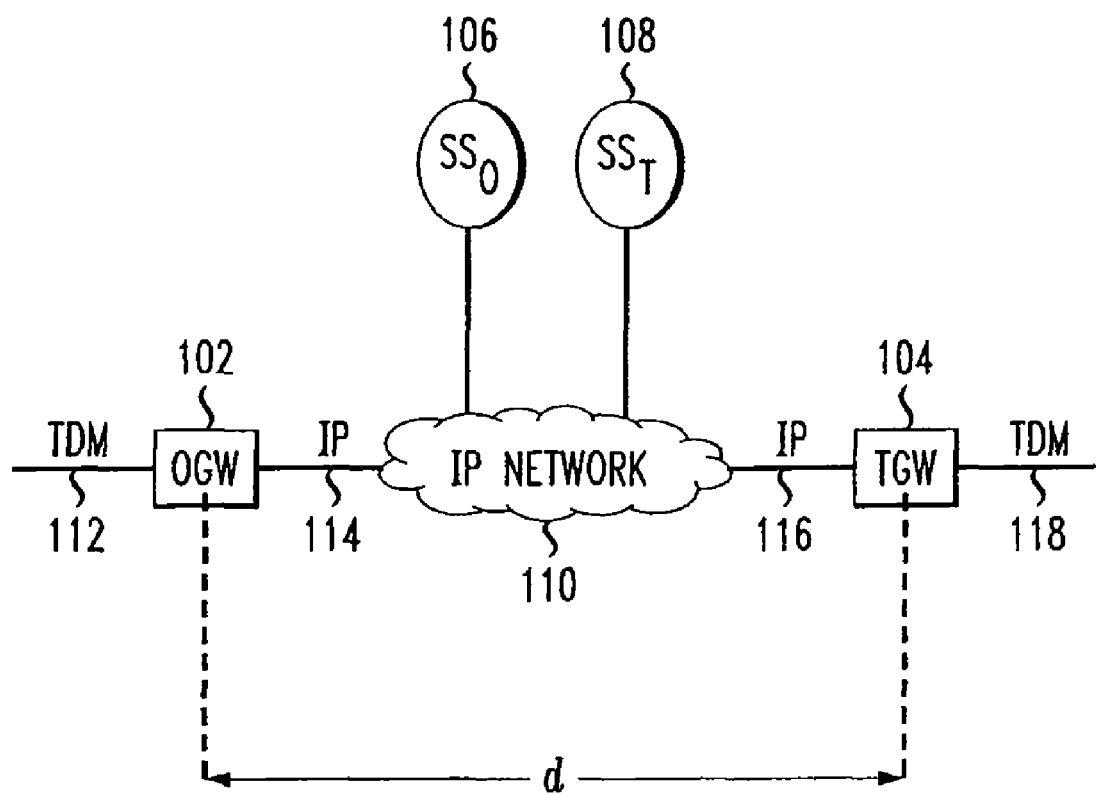
FIG. 1 illustrates a block diagram of a network architecture that implements the present invention.

The present invention is directed to a method of sizing packets over a communications network (e.g., Internet Protocol (IP) network) on a per call basis for voice communications (e.g., Voice over IP (VoIP) calls). FIG. 1 illustrates a network architecture in which the present invention is implemented. The major components of the architecture include an originating media gateway (OGW) 102, a terminating media gateway (TGW) 104, an originating soft switch ($SS_O$) 106, a terminating soft switch ($SS_T$) 108 and an IP network 110. It is to be understood by those skilled in the art that while the present description refers to an IP network, other packet-based communication networks could be considered, such as, but not limited to Asynchronous Transfer Mode (ATM) networks, frame relay networks or other types of data networks. Further, the method described herein is directed toward a two-party call, but can also be directly applied to multi-party calls.

The OGW 102 packetizes the voice signals destined for the TGW 104, and de-packetizes the voice signals coming from the TGW 104, under the control of the $SS_O$ 106. The TGW 104 packetizes the voice destined for the OGW 102, and de-packetizes the voice coming from the OGW 102, under the control of $SS_T$ 108. The media gateways (i.e., OGW 102 and TGW 104) can be trunking gateways located in a carrier's network or Customer Premises Equipment located on a customer's premises. The OGW 102 and TGW 104 are responsible for converting between Time Division Multiplexed (TDM)-encoded voice streams 112, 118 and VoIP streams 114, 116.

The distance between OGW 102 and TGW 104 is d. The $SS_O$ 106 and $SS_T$ 108 perform routing and call control functions including service processing and signaling. The $SS_O$ 106 controls OGW 102 and the $SS_T$ 108 controls TGW 108.

The $SS_O$ 106 and the $SS_T$ 108 also communicate with one another on a per-call basis to determine, among other things, the location and port assignments at the gateways. It is to be understood by those skilled in the art that while the functions of the soft switches are separable from the functions of the media gateways, these functions could be physically combined into an integrated switch without departing from the scope of the present invention. Furthermore, $SS_T$ could be the same switch as $SS_O$. The IP network 110 carries VoIP Real Time Protocol (RTP) streams 114, 116 between the OGW 102 and TGW 104, as well as a corresponding Real Time Control Protocol (RTCP) stream between OGW 102 and TGW 104 and all signaling messages between the various architectural components.

Figure 2:
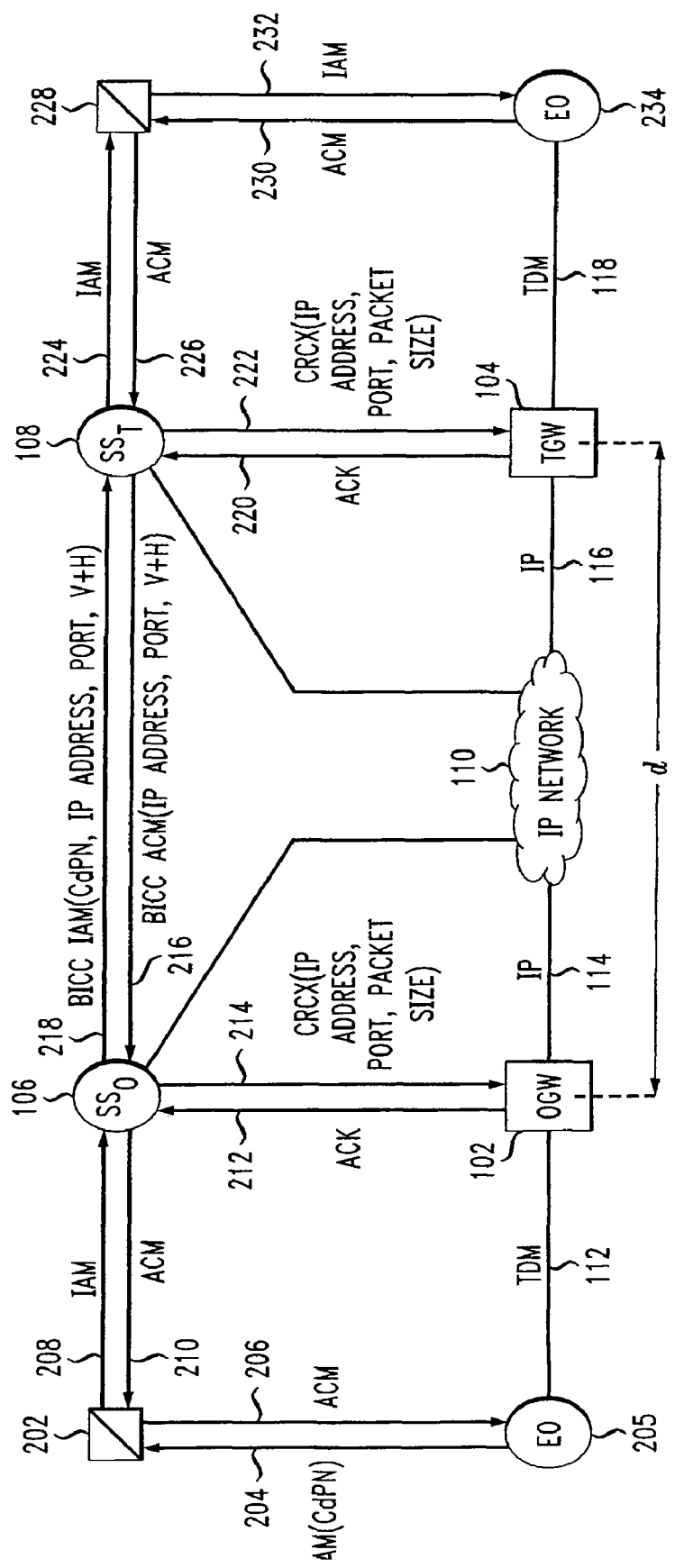
FIG. 2 illustrates a block diagram of the network architecture of FIG. 1 that further includes call flow information using trunking gateways in accordance with the present invention.
Figure 4:
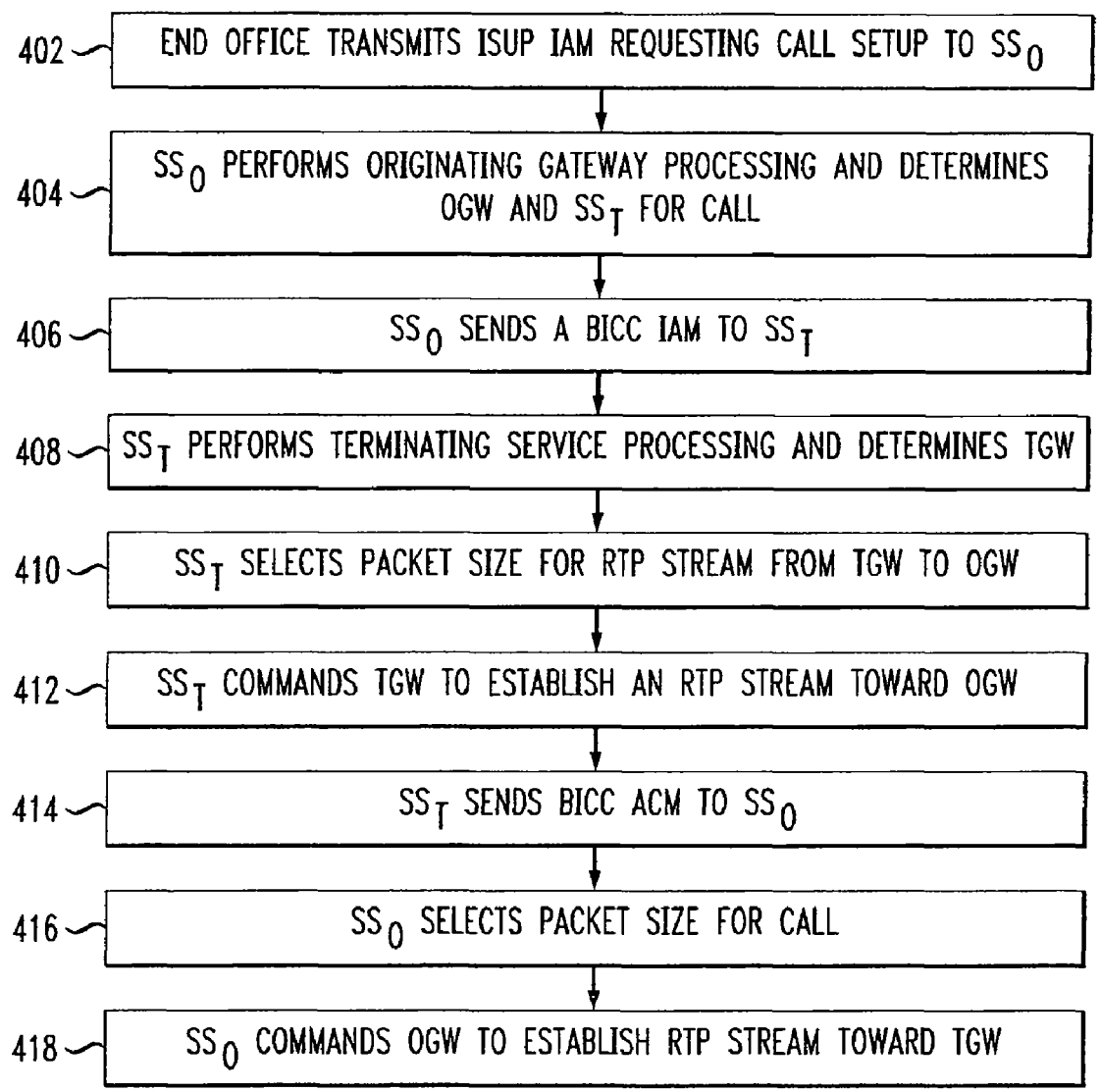
FIG. 4 is a flow chart that depicts the call flow between end offices depicted in FIG. 2 in accordance with the present invention.

While any number of signaling protocols could be used to support this feature, the description of feature operation assumes that Integrated Services Digital Network (ISDN) User Part (ISUP) is used for access to soft switches $SS_O$ 106 and $SS_T$ 108. Bearer Independent Call Control (BICC) is assumed to be the signaling protocol between the soft switches $SS_O$ 106 and $SS_T$ 108, although SIP or SIP-T can also be used. The signaling protocol, H.248 is assumed to be the signaling protocol used between soft switches $SS_O$ 106 and $SS_T$ 108 and media gateways OGW 102 and TGW 104, respectively, but other protocols could also be used FIGS. 2 and 4 illustrate the network architecture of FIG. 1 and further include call flow information between the various network components in accordance with the present invention. An End Office (EO) 205 transmits an ISUP Initial Address Message (IAM) 204 requesting a call to be setup to a particular called number (CdPN) to $SS_O$ 106 (step 402). The $SS_O$ 106 performs any originating call processing and, as part of its routing function, determines the originating gateway OGW 102 and terminating soft switch $SS_T$ 108 involved in the call (step 404). The originating soft switch $SS_O$ 106 sends a Bearer Independent Call Control (BICC) IAM 218 including the CdPN to $SS_T$ 108 (step 406).

Also included in the IAM is information for enabling the $SS_T$ 108 to determine the packet size to be used for the RTP stream from the TGW 104 toward the OGW 102. The specific information considered for the determination of the packet size would depend on the algorithm used for selecting packet size as will be described in more detail hereinafter. Upon receipt of the BICC IAM 218, $SS_T$ 108 performs any required terminating call processing, and based on the CdPN, determines the terminating gateway TGW 104 involved in the call (step 408). The $SS_T$ 108 then selects a packet size for the RTP stream from the TGW 104 to the OGW 102 (step 410).

Once an appropriate packet size has been determined, $SS_T$ 108 commands the TGW 104, through the use of an H.248 Create Connection (CRCX) command 222, to establish an RTP stream with the selected packet size toward the OGW 102 (step 412). $SS_T$ 108 then sends a BICC Address Complete Message (ACM) 216 to $SS_O$ 106 (step 414). Included in ACM 216 is information that would enable $SS_O$ 106 to determine the packet size to be used for the RTP stream from the OGW 102 toward the TGW 104. The particular information included depends upon the specific algorithm used for selecting packet size and could include Vertical and Horizontal (V and H) coordinates of TGW 104 as will be described in more detail hereinafter. Upon receipt of ACM, $SS_O$ 106 selects a packet size for the call (step 416).

Once $SS_O$ 106 has determined an appropriate packet size, $SS_O$ 106 commands OGW 102, through the use of an H.248 Create Connection (CRCX) command 214, to establish an RTP stream with the selected packet size, toward TGW 104 (step 418). Call flow continues in accordance with conventional signaling procedures employed by those skilled in the art. Once the RTP stream is set up, OGW 102 and TGW 104 can also autonomously monitor the packet size of the RTP stream, based on information obtained by monitoring the RTP stream, the RTCP stream set up to TGW 104, or other directly measured network attributes.

Figure 3:
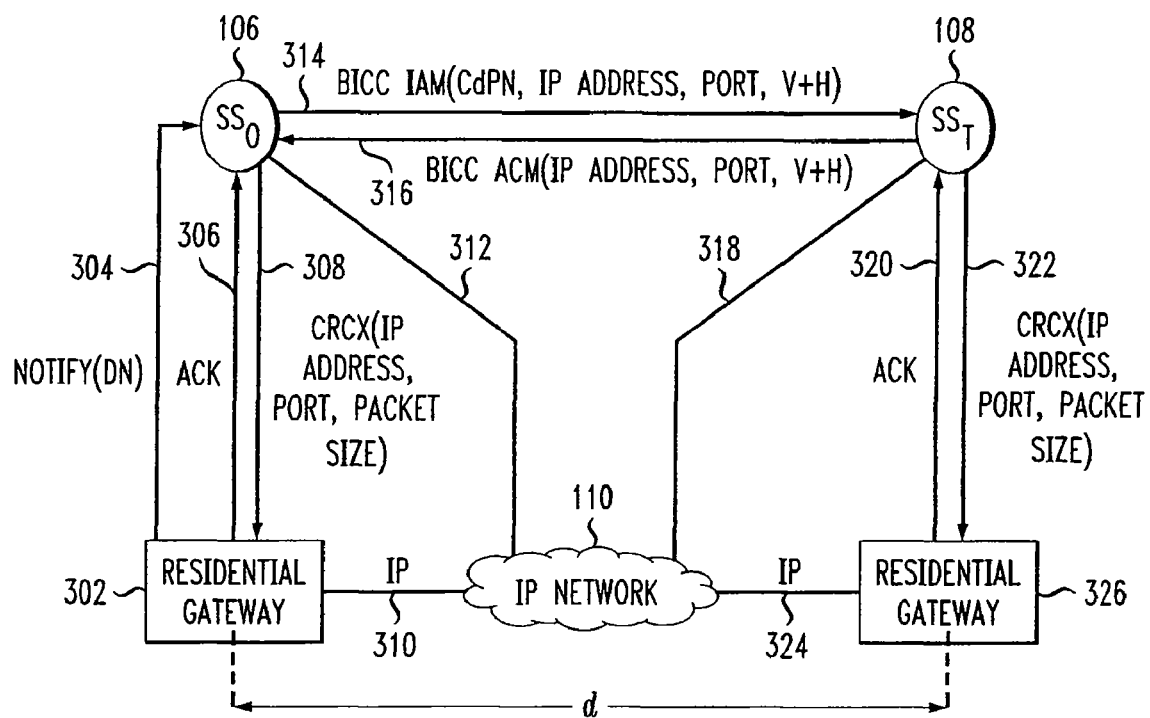
FIG. 3 illustrates a block diagram of the network architecture of FIG. 1 that further includes call flow information using Customer Premises Equipment (CPE) such as a Residential gateway or an IP Private Branch Exchange (PBX) in accordance with the present invention.
Figure 5:
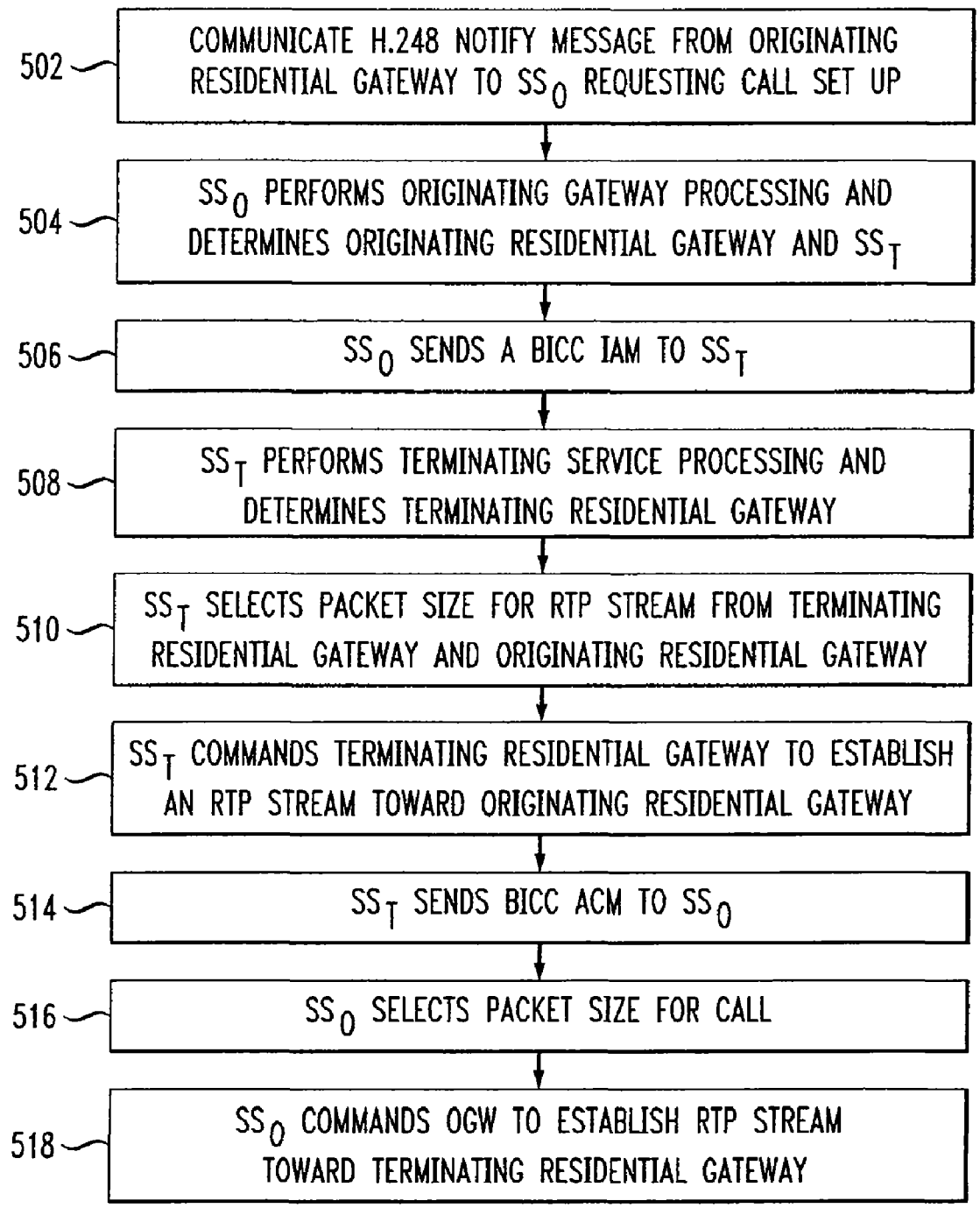
FIG. 5 is a flow chart that depicts the call flow between residential gateways depicted in FIG. 3 in accordance with the present invention.

FIGS. 3 and 5 illustrate an architecture and call flow information for a VoIP call in which residential gateways are employed. H.248 messaging is used between residential gateways 302, 326 and soft switches $SS_O$ 106, $SS_T$ 108, respectively. It is to be understood by those skilled in the art that Session Initiation Protocol (SIP) messaging could be used as well without departing from the scope of the present invention. BICC messaging is used to communicate between the soft switches $SS_O$ 106 and $SS_T$ 108. Again, the soft switches could also use SIP messaging.

An H.248 NOTIFY message 304 including the destination number is communicated from the residential gateway 302 to soft switch $SS_O$ 106 to request that a call be set up to the destination number (step 502). The $SS_O$ 106 performs any originating call processing and, as part of its routing function, determines the originating residential gateway 302 and terminating soft switch $SS_T$ 108 involved in the call (step 504). The originating soft switch $SS_O$ 106 sends a BICC IAM message 314 including the destination number to $SS_T$ 108 (step 506).

Also included in the IAM is information for enabling the $SS_T$ 108 to determine the packet size to be used for the RTP stream from the terminating residential gateway 326 toward the originating residential gateway 302. The specific information considered for the determination of the packet size would depend on the algorithm used for selecting packet size as will be described in more detail hereinafter. Upon receipt of the BICC IAM 314, $SS_T$ 108 performs any required terminating call processing, and based on the destination number, determines the terminating residential gateway 326 involved in the call (step 508). The $SS_T$ 108 then selects a packet size for the RTP stream from the terminating residential gateway 326 to the originating residential gateway 302 (step 510).

Once an appropriate packet size has been determined, $SS_T$ 108 commands the terminating residential gateway 326, through the use of an H.248 Create Connection (CRCX) command 322, to establish an RTP stream with the selected packet size toward the originating residential gateway 302 (step 512). $SS_T$ 108 then sends a BICC Address Complete Message (ACM) 316 to $SS_O$ 106 (step 514). Included in ACM 316 is information that would enable $SS_O$ 106 to determine the packet size to be used for the RTP stream from the originating residential gateway 302 toward the terminating residential gateway 326. The particular information included depends upon the specific algorithm used for selecting packet size and could include Vertical and Horizontal (V and H) coordinates of terminating residential gateway 326 as will be described in more detail hereinafter. Upon receipt of ACM 316, $SS_O$ 106 selects a packet size for the call (step 516).

Once $SS_O$ 106 has determined an appropriate packet size, $SS_O$ 106 commands originating residential gateway 302, through the use of an H.248 Create Connection (CRCX) command 308, to establish an RTP stream with the selected packet size, toward terminating residential gateway 326 (step 518). Call flow continues in accordance with conventional signaling procedures employed by those skilled in the art.

As indicated above, various algorithms can be used to determine packet size in accordance with the present invention. Some considerations addressed by the algorithms include latency, bandwidth utilization, and packet per second routing limitations. When carrying two-way, real-time voice communications between two endpoints, an important factor affecting the voice quality is the latency or delay incurred by the voice path between the endpoints. To achieve "toll-quality" voice communications, the one-way delay must be kept below a threshold of 150 ms, although the present invention will work with any threshold a carrier chooses to establish.

In a VoIP network, which packetizes the voice signals and transmits it as IP packets over an IP network, there are a number of sources of delay that must be managed and minimized. The end-to-end delay for a voice call in a VoIP network is calculated as follows:

$$delay_{end\text{-}to\text{-}end} = delay_{packetization} + delay_{emission} +$$
$$delay_{routing} + delay_{transmission} + delay_{jitter} + delay_{other} \leq 150 \text{ ms}$$

where $delay_{packetization}$ is the time it takes to form a single packet, and is related to packet size;

$delay_{emission}$ is the time it takes to pass the bits of a packet onto the outgoing facility, and is related to the line speed and packet size;

$delay_{routing}$ is the cumulative time it takes for the routers in the IP network to pass the packet between the endpoints, and is related to the number of router hops, the QoS and routing algorithms employed, and the capacity and utilization of the routers involved in the connection;

$delay_{transmission}$ is the time it takes for the optical signal to pass between the endpoints, and is related to the speed of light over the transmission medium (e.g., fiber) and the distance between the endpoints;

$delay_{jitter}$ is the time it takes to buffer the incoming packets to compensate for the jitter (i.e., delay variation) incurred while transiting the IP network;

$delay_{other}$ includes all other sources of delay, such as echo processing and delay introduced in the ILEC network.

Some of these aspects of delay can be managed and some cannot. For example, the minimum transfer delay, which is related to the speed of light and the physical distance between the endpoints is fixed. All other items can be engineered, to one extent or another, by selection, sizing, and placement of various architectural components. Since it is total end-to-end delay that must be minimized, if one delay component is smaller for a certain call under a particular condition, then another component can be increased in size, provided that end-to-end delay is kept below the 150 ms normal maximum for toll-quality calls. As such, each of the variable aspects of delay can be adjusted as needed so long as the overall delay is within the required restraints.

A second consideration in determining packet size is bandwidth utilization. Headers are added to each packet in an IP network to support a variety of functions such as routing, time-stamping, error checking, packet loss detection, etc. For a given flow of packets between two IP addresses, the header is the same size and largely the same content for each packet in the flow. Since the header in a packet is purely overhead, it is desirable to minimize the ratio of header size to total packet size. This can be accomplished by either reducing the header size or increasing the packet size by increasing the payload size. While header compression techniques can be used to reduce the header size, this patent describes a method that alters the payload size to either increase or decrease the total packet size, thus managing the ratio of header size to total packet size.

Increasing packet size minimizes the amount of bandwidth used in the network for overhead, and increases the bandwidth utilization in the network. A high utilization means that the bandwidth and real-time processing resources are used efficiently and transport and port costs are minimized. In the case of a fixed header size, a larger packet has better bandwidth utilization than a smaller packet. As a result, it is desirable to keep the packet size in the network as large as possible, while ensuring that it is small enough to ensure that the latency remains below the allowable maximum.

Another consideration is packet per second throughput. In all communications systems, the processing power of a device limits its throughput. The choice of processor is thus driven, at least in part, by the expected throughput requirements for the device. IP routers are designed to handle traffic loads that are dominated by data services. One characteristic of IP packets for data services is that they tend to be relatively large—typically 2-3 times larger than voice packets. This characteristic leads to router designs that can support the packet per second throughput needed for data services.

To meet latency requirements of voice services, on the other hand, require smaller packet sizes. Adding voice to an IP network designed to carry data changes the traffic mix in the network. Specifically, since voice traffic requires relatively small packet sizes to meet latency requirements, a given bandwidth of voice traffic requires a higher packet per second processing capacity than the same bandwidth of data traffic, thus placing a greater throughput demand on the network routers.

Since VoIP generates more packets per second than data due to the smaller packet size, it follows that smaller VoIP packets generate more packets per second than larger VoIP packets. By selecting larger VoIP packets in situations where the extra delay can be tolerated, the packet per second demand on the network routers can be significantly reduced.

All of these considerations can be used in the present invention, either separately or in combination, to determine packet size on a per call basis. In accordance with the present invention, appropriate packet size for a given call is based primarily on the distance between the endpoints involved in the call. If the endpoints are far apart, the selected packet size will be small. If the endpoints are close together, the selected packet size will be larger. In both cases, it is desirable to use as large a packet size as possible while ensuring that the total end-to-end delay is kept below 150 ms. The large packet size improves bandwidth utilization and reduces packet per second load in the network as described above. By maintaining the delay below 150 ms, the voice quality is preserved.

Calculating the distance between gateways may be accomplished by using Vertical and Horizontal (V and H) coordinates and selecting an appropriate packet size based on the distance. The V and H coordinates can be provisioned manually or automatically determined by including Global Positioning System (GPS) circuitry in the gateways. The distance can be measured in terms of air miles or as facility route miles. In the case of measuring by facility route miles, additional information regarding facility deployments would need to be provisioned for example in a look-up table. It would be accurate enough for this application to assume a fixed relation between air miles and facility miles.

Another option is to approximate distance between the originating and terminating gateways can be calculated by using the state portion of the Common Language Location Identifier (CLLI) code. The CLLI code is an 11 digit alphanumeric code that is used to identify physical locations of in-service telecommunications equipment. The state portion is typically identified by the fifth and sixth character of the code.

Another method for determining the distance between the originating and terminating gateways is by assigning zones to each gateway in the network. Then, the number of zones between the originating gateway and terminating gateway will provide a distance measurement. This measurement can be used to select an appropriate packet size based on the zone differential.

Alternatively, the gateway locations can be identified by using provisioned data. In particular, data pairs corresponding to the Destination Point Code (DPC)/Circuit Identification Code (CIC) pairs can be used to identify gateway location. The DPC is the part of the SS7 routing label that identifies where an SS7 signaling message should be sent. The CIC is the part of the SS7 signaling message used to identify the circuit that is being established between two signaling points or gateways.

A simplified method for determining distance between gateways is to use the geographic number plans (e.g., North American numbering plan) or postal zip codes. For example, a call from New Jersey to California could easily be identified by the area code of the called party's telephone number and the area code of the dialed number.

An alternative method for determining packet size may be to predetermine a packet size for VoIP streams originating from a particular gateway. The size may be based on the location of the gateway within the country and its maximum distance from other gateways in the country. For example, in the United States, a relatively small (e.g., 10 ms) packet size can be used for all gateways located along the east and west coasts of the country, and a larger (e.g., 30 ms) packet size can be used for all gateways in the geographic center of the country. In the case of a mobile IP device there would be a need for the device to self-identify its geographic location by using, for example, a Global Positioning System (GPS).

Packet size can also be selected based on the dynamic or static information pertaining to the availability status of routes between the OGW and TGW in the network. For example, if it were known that primary (i.e., shortest distance) routes are unavailable, but secondary (i.e., longer distance) routes are, a shorter packet size would be selected to compensate for the longer expected transport delay. Dynamic information could also be considered that pertains to the congestion status of routes between the OGW and TGW. For example, if maintenance personnel determine that there is heavy congestion on some routes, traffic could be rerouted along alternative longer routes. In that case, smaller packet sizes would be used to compensate for the longer expected transport delay.

Dynamic information pertaining to the current delay characteristics of the network could also be considered. Delay can be measured through a variety of means, including using the time stamps on signaling messages, or using the time stamps on RTP or RTCP packets. Both of these techniques require network-wide time synchronization for all gateways. Alternatively periodic ping messages could be sent between gateways to determine delay. Furthermore, provisioned data for all possible OGW/TGW pairs could be used to determine packet size.

In another alternative embodiment, there can be additional constraints on packet size selection for purposes of ensuring a particular traffic mix. For example, because of the extra bandwidth and processing required for 5 ms packets, there could be a limitation on the concurrent number of calls using 5 ms packets, such as 5% of the calls. Similar constraints could also be imposed on other packet sizes, and the constraints in place at a given point in time could either be fixed, or could be adaptive to network conditions.

In furtherance of the present invention, other factors can be incorporated in addition, to select packet size for determining routing characteristics for a particular VoIP call. These factors could be used in conjunction with the distance considerations or as alternatives to the distance considerations. For example, the current performance of the network could be contemplated. Such consideration might take into account the current congestion state of the network and any route failures. Another consideration might be service requirements. For some services, such as facsimile or voice-band data services, delay is more tolerable. As such, satisfactory performance for those services could be obtained even though larger packets may be used to transport the communications.

Another way to determine packet size is by identifying classes of customers. For example, customers who are willing to pay a premium could get smaller packet transport than those customers who do not pay a premium. Access methods (e.g., wireless or high speed Internet access (e.g., digital subscriber line or cable modem) as opposed to modem access) can also be taken into account. Service class may also be determined by using signaled information such as the Calling Party Number (CPN), CdPN, SS7 nature of connection satellite indicator, or other SS7 parameters. Provisioned information, such as trunk group or customer data may also be used to determine a particular service class.

Service class could also be determined based on the "type" of call. Call types may include facsimile calls, voice-band data calls, budget calls, premium calls, international calls, wireless calls, satellite calls or bridged calls. In the case of facsimile calls, voice-band data calls and budget calls, larger packets would be used to transport these calls. Smaller packets would be used to transport the other call types.

While the present invention has been described in connection with the illustrative embodiments, it will be appreciated and understood that modifications may be made without departing from the true spirit and scope of the invention.

We claim:

1. A method for sizing packets over a network on a per communication basis, the method comprising:
   receiving a request for a communication to be setup to a destination;
   determining an originating gateway and a terminating gateway to be involved in the communication;
   selecting a packet size for packets associated with a voice communication to be communicated between the originating gateway and the terminating gateway;
   commanding the originating gateway to establish a packet stream comprising the packet size that is selected toward the terminating gateway; and
   commanding the terminating gateway to establish a packet stream comprising the packet size that is selected toward the originating gateway.

2. The method of claim 1, wherein the selecting a packet size comprises calculating a distance between the originating gateway and the terminating gateway.

3. The method of claim 2, wherein the distance is calculated based on a vertical coordinate and a horizontal coordinate associated with the terminating gateway.

4. The method of claim 3, wherein the vertical coordinate and the horizontal coordinate are provisioned manually.

5. The method of claim 3, wherein the vertical coordinate and the horizontal coordinate are determined by a global positioning system.

6. The method of claim 2, wherein the calculating the distance comprises:
   assigning zones in the network; and determining how many zones are between the originating gateway and terminating gateway.

7. The method of claim 2, wherein the calculating the distance comprises:
establishing a first data pair comprising a first destination point code and a first circuit identification code to identify a location for the originating gateway;
establishing a second data pair comprising a second destination point code and a second circuit identification code to identify a location for the terminating gateway; and
using the first data pair and the second data pair to determine the distance between the originating gateway and the terminating gateway.

8. The method of claim 1, wherein the packet size is selected in accordance with available routes in the network between the originating gateway and terminating gateway.

9. The method of claim 8, wherein a class of service is defined by an amount paid per communication by a user.

10. The method of claim 8, wherein the class of service is defined by an access mechanism utilized by the user, wherein the access mechanism is determined from among: a wireless device, a digital subscriber line, a cable modem and a dial-up access.

11. The method of claim 10, wherein the wireless device identifies its geographic location to the network.

12. The method of claim 1, wherein the network is an internet protocol network.

13. The method of claim 1, wherein the communication is a voice-band data call.

14. The method of claim 1, wherein a parameter in a signaling message is used to communicate information to be used in determining a distance between the originating gateway and the terminating gateway.

15. A method for sizing packets over a network on a per communication basis, the communication being communicated between a calling party and a called party via gateways, the method comprising:
acquiring first data from a first gateway, the first data comprising location data for the first gateway;
sending the first data to a soft switch based on a predefined parameter;
receiving additional data from the soft switch relating to a second gateway;
determining a packet size for the communication based on the first data and the additional data; and
instructing the gateways to use packets of the packet size for the communication.

16. The method of claim 15, wherein the soft switch is an originating soft switch and the second gateway is an originating gateway.

17. The method of claim 15, wherein the soft switch is a terminating soft switch and the second gateway is a terminating gateway.

18. The method of claim 15, wherein the predefined parameter is a distance measurement between the first gateway and the second gateway.

19. The method of claim 18, wherein the distance measurement is calculated based on a vertical coordinate and a horizontal coordinate associated with the second gateway.

20. The method of claim 19, wherein the vertical coordinate and the horizontal coordinate are provisioned manually.

21. The method of claim 19, wherein the vertical coordinate and the horizontal coordinate are determined by a global positioning system.

* * * * *